Jan. 1, 1924. 1,479,188
F. E. LARSON
GROUND TILLING MACHINE
Filed April 26, 1920 4 Sheets-Sheet 1
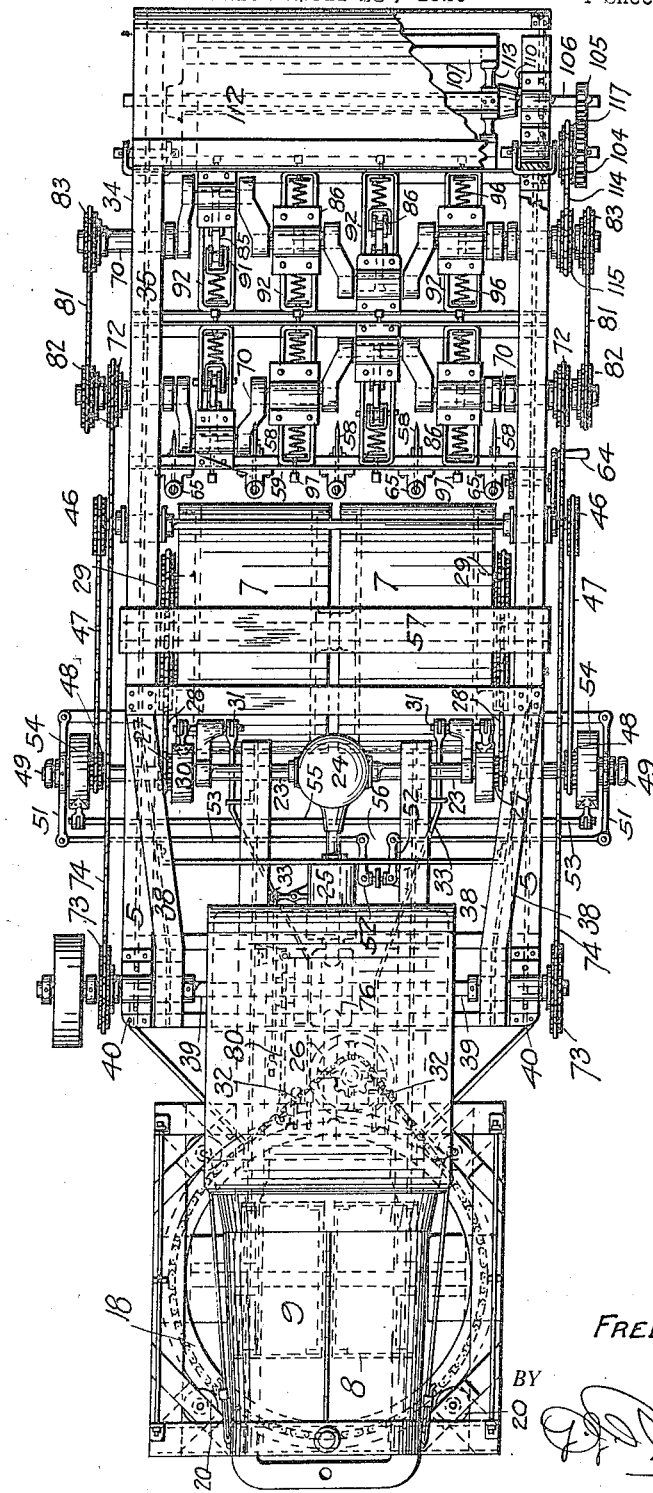
INVENTOR.
FRED E. LARSON.
BY
ATTORNEY.

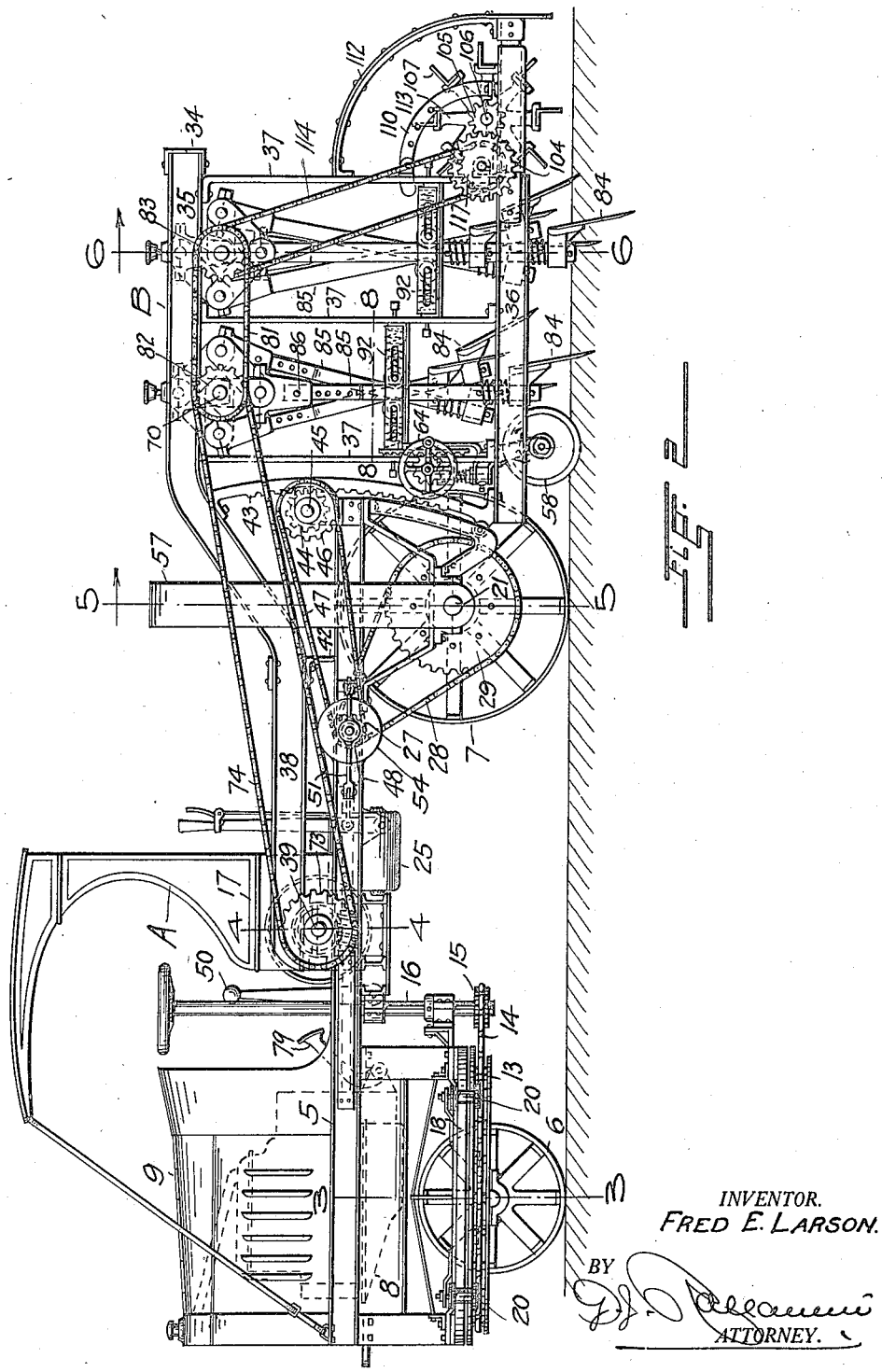

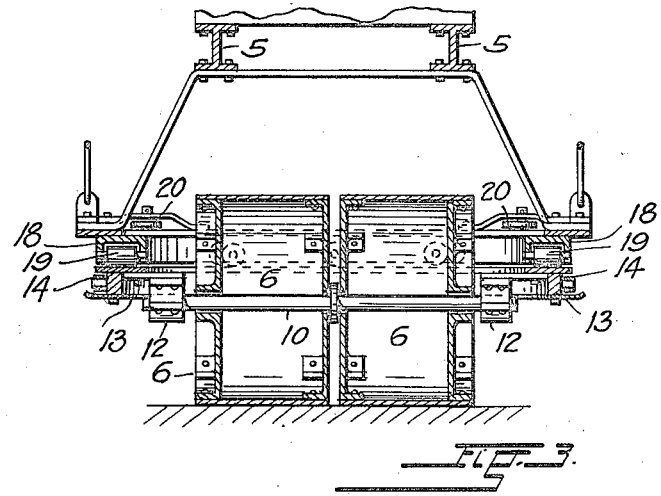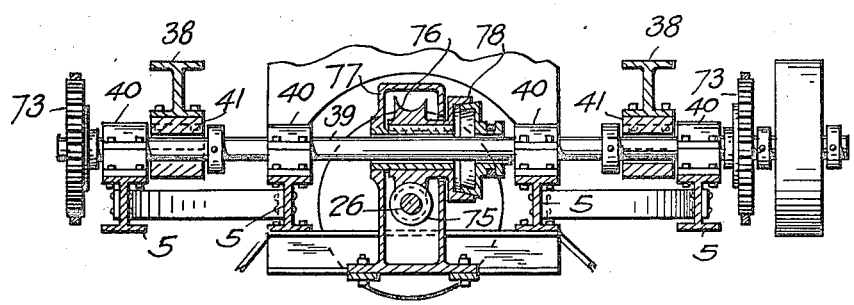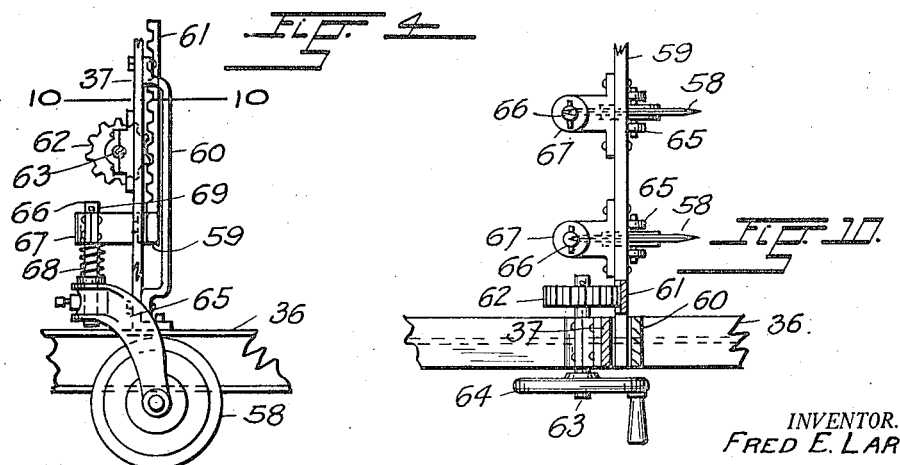

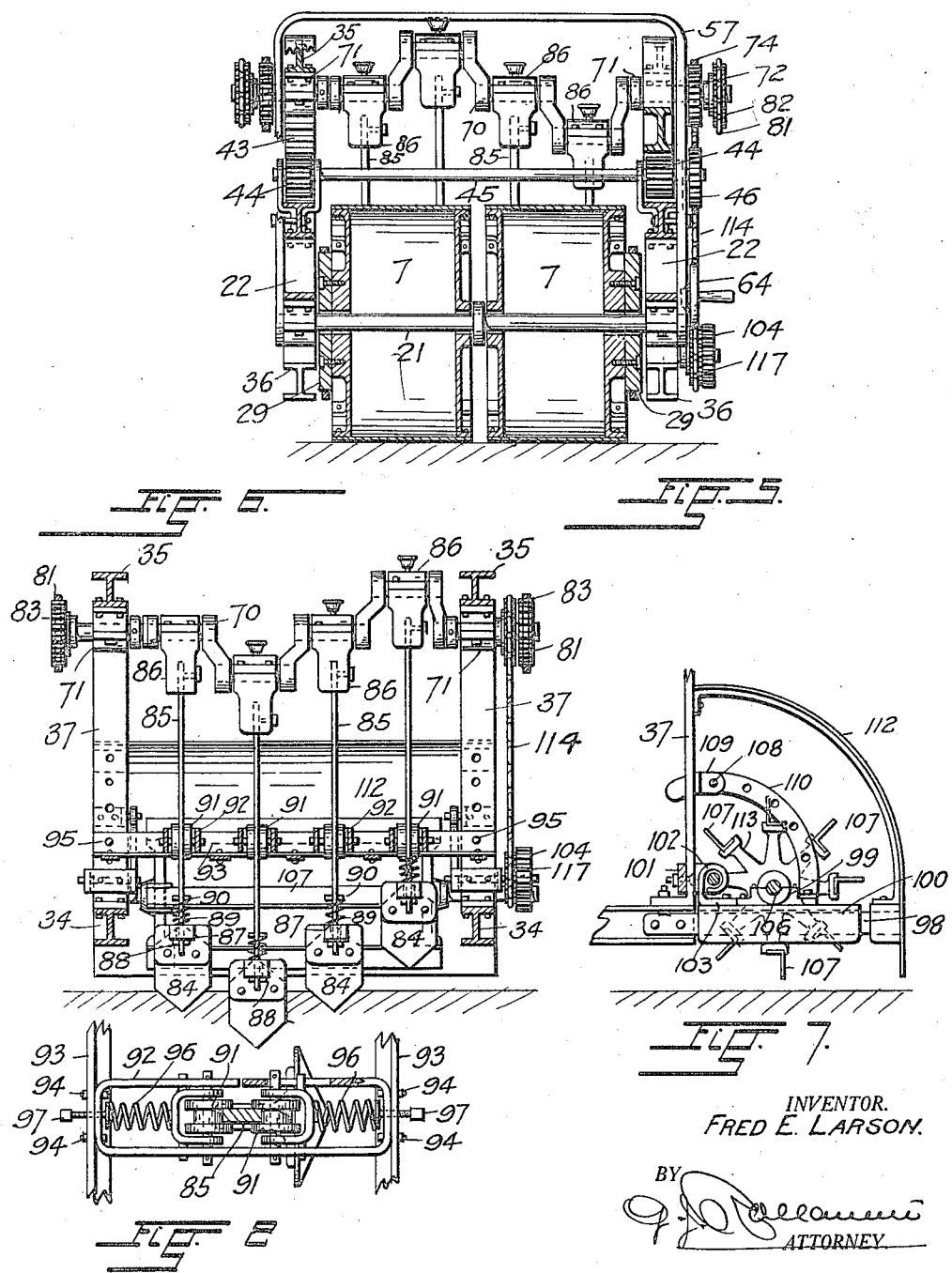

Patented Jan. 1, 1924.

1,479,188

UNITED STATES PATENT OFFICE.

FRED E. LARSON, OF DENVER, COLORADO.

GROUND-TILLING MACHINE.

Application filed April 26, 1920. Serial No. 376,754.

*To all whom it may concern:*

Be it known that I, FRED E. LARSON, a citizen of the United States, residing at Denver, in the county of Denver and State of Colorado, have invented certain new and useful Improvements in Ground-Tilling Machines, of which the following is a specification.

This invention relates to ground tilling machines of the type in which a plurality of reciprocating spades cooperate with suitable reduction devices to place the soil in one operation in the proper condition for seeding or planting.

It is an object of the present invention to provide in a machine of this character a carrier on which the tilling implements are assembled, in operative and adjustable connection with a tractor of suitable construction.

Another object of the invention resides in the provision of traction rolls which support the tractor and prepare the ground for the operation of the tilling devices by flattening vegetation and other obstructive matter.

Further objects of the invention reside in providing a simple and efficient method of constructing, mounting and adjusting the cooperating elements of the tilling machine and still other objects reside in providing novel features of construction and arrangements of parts all of which will fully appear in the course of the following description taken in connection with the accompanying drawings which show an embodiment of my invention in the best form at present known to me.

In the drawings in the various views of which like parts are similarly designated, Figure 1 is a sectional plan view of my soil-tilling machine;

Figure 2, a side elevation of the same;

Figure 3, a section on the line 3—3, Figure 2;

Figure 4, an enlarged section along the line 4—4, Figure 2;

Figure 5, a section taken along the line 5—5, Figure 2;

Figure 6, a section along the line 6—6, Figure 2;

Figure 7, a sectional detail view of the disintegrating drum at the rear end of the machine;

Figure 8, an enlarged section on the line 8—8, Figure 2 showing a sectional plan view of one of the adjustable fulcrums of the oscillating spades of the machine;

Figure 9, an enlarged detail view of one of the colters of the machine, and

Figure 10, a section taken on the line 10—10, Figure 9.

The reference character A designates a tractor of suitable construction for the propulsion and operation of the ground tilling elements of the machine and B a carrier upon which said elements are cooperatively assembled. The carrier is movable for up and down adjustment with relation to the tractor so that its implements may be elevated above the surface of the ground in transporting the machine for operation in different localities, and a suitable mechanism is provided to effect said adjustments by the power of the engine of the tractor.

The tractor consists of a frame 5 of structural metal supported at its ends upon rollers 6 and 7 and carrying an engine 8 of suitable size and construction beneath the usual hood 9. The front rollers 6 of the tractor which are utilized in steering the machine, are loosely mounted for independent rotation upon a shaft 10 supported in boxes 12 on a horizontally disposed rotary sprocket wheel 13 which by means of a chain 14 is operatively connected with a pinion 15 at the lower end of an upright steering shaft 16 mounted adjacent the driver's seat 17 of the vehicle.

The wheel 13 bears against a superposed roller track 18 preferably composed of a ring of channeled section which carries a plurality of trunnioned rollers 19 for engagement with a flat bearing surface on the sprocket wheel with which the traction rollers 6 are connected.

Flanged rollers 20 mounted on the track frame at different points of the periphery of the circular track and the wheel which are of substantially equal diameters, serve to maintain the two parts in cooperative relation.

The rollers 7 at the rear end of the tractor are of larger diameter than those at the front end of the same and they are mounted for independent rotation upon a shaft 21 supported in hangers 22 on the main frame of the machine. The rollers 7 like those at the front end of the tractor, are placed close together to evenly engage a strip of ground to be worked by the tilling elements on the carrier, for the purpose of crushing weeds, stubbles and other vegetable growth, and generally flattening the ground to facilitate the operation.

The rollers 7 are separately connected with the opposite shaft members 23 of a differential movement 24 of ordinary construction which through the intermediary of a selective transmission 25 is operatively connected with the shaft 26 of the engine at the front end of the tractor.

The shaft members 23 are to this end provided with sprocket wheels 27 which by means of chains 28 are separately connected with sprocket wheels 29 of larger diameter on the respective rolls.

In order to facilitate a turning movement of the machine in either direction the differential-shafts may be separately restrained from rotation by the use of brakes 30 each consisting of a drum mounted on the respective shaft, a band surrounding the drum in connection with a toggle 31, and a foot lever 32 which is connected with the toggle through the medium of a rod 33.

The carrier 13 is composed of a frame 34 of structural metal made up of upper and lower sections 35 and 36 connected by upright standards 37.

The side sills of the upper section are extended to provide forwardly extending arms 38 by which the carrier is connected with the tractor.

The connection is established through the medium of a horizontal shaft 39 which is rotatably mounted in bearings 40 on the main frame of the tractor and with which the arms of the carrier are pivotally connected through the intermediary of boxes 41.

When the carrier is in its normal operative position it is supported upon the tractor frame by means of feet 42 on its forwardly projecting arms, which engage with the subjacent side sills of said frame as shown in Figure 2 of the drawings.

To vary the elevation of the carrier by pivotal movement of its arms upon the shaft 39 it is provided with two segmental racks 43 which are operatively engaged by pinions 44 on a countershaft 45 rotatably supported in boxes at the rear end of the tractor frame.

Sprocket wheels 46 at opposite ends of the shaft are by means of chains 47 connected with corresponding sprocket wheels 48 loosely mounted upon the ends of the shaft-sections 23 of the differential movement.

Clutches 49 are provided to connect the last-mentioned sprocket wheels with the differential-shafts when an adjustment of the carrier is desired and these clutches are connected with an operating lever 50 for synchronous operation, by means of a system of levers 51 and 52 and connecting rods 53.

In order to stop the movement of the carrier at any desired point of its adjustment and to securely hold the same in its adjusted positions, the sprocket wheels of the differential shafts are combined with brake drums 54, and friction bands placed around these drums are connected with the same hand-lever by means of a rod 55 and a pivoted arm 56.

It will be apparent that under ordinary working conditions the carrier frame rests upon the frame of the tractor by means of the feet on its forwardly extending arms while the sprocket wheels are loose on the differential shafts and their respective brakes are set.

When it is desired to change the elevation of the carrier the clutch members on the sprocket wheels and the differential shafts are connected by adjustment of the hand-lever, and their brake drums are simultaneously released by loosening the respective bands. The consequent rotation of the pinions upon the racks causes the carrier to be raised until the sprocket wheels are again disconnected from their shafts and its further movement is arrested by simultaneous setting of the brakes.

It will be understood that a downward movement of the carrier is obtained by the same operation after the movement of the differential shafts has been reversed by proper adjustment of the transmission 25.

A bridge 57 extending upwardly from the bearings of the shaft 21 on which the rollers 7 are mounted, in rigid connection with the side sills of the tractor frame, guide the arms of the carrier in their up and downward motions and prevent their lateral displacement.

The ground tilling elements of the machine which as stated hereinbefore are mounted for cooperation on the carrier, include a cutting element which divides the ground into strips after it has been flattened by the contact of the rollers 6 and 7 and preparatory to its being turned by the spading element which digs and turns the ground, and a disintegrating element which cooperates with the spading element in pulverizing the disturbed soil.

The cutting element placed forwardly of the spading element, consists of a number of equidistantly spaced cutting disks or colters 58 which are assembled on a bar 59 extending crosswise of the frame of the carrier. The bar is mounted to slide in vertical guideways formed by straps 60 which are bolted to the adjacent uprights 37 of the frame and it is provided for its adjustment, with upright rack bars 61.

The rack bars are engaged by pinions 62 on short shafts 63 which are rotatably supported in bearings on the same uprights and which at their outer ends carry handwheels 64 for their rotation.

The colters are rotatably mounted in bifurcated curved arms 65 which terminate in upwardly extending stems 66 slidably fitted in bearings 67 on the cross bar 59.

Springs 68 coiled around the stems between shoulders at their juncture with the curved arms, and the respective bearings, yieldingly oppose the upward movement of the colters and pins 69 at the upper ends of the stems limit the downward movement of the same.

It will be seen that in the operation of the machine the yielding connection of the colters with the bar on which they are mounted allows of their passing across stones and other obstructions without injury or breakage and that by rotation of the hand-wheels 64 the depths at which they enter the ground may be gauged according to the condition and nature of the soil.

The pivotal connection of the stems 66 in the boxes 67 permit of a lateral movement of the colters 58 to avoid obstructions and to widen the grooves produced in the soil through which they are propelled.

The spading elements of the machine, of which there are two in the construction shown in the drawings, each comprises a multiple crank shaft 70 mounted in bearings 71 on the upper section of the carrier frame, and preferably having four cranks progressively arranged at right angles with relation to each other.

The foremost crank shaft carries two sprocket wheels 72 for its connection with corresponding wheels 73 on the transverse shaft 39 of the tractor, with which the carrier frame is pivotally connected as hereinbefore described, the chains 74 by which the sprocket wheels are connected extending at opposite sides of the frame of the tractor and the carrier.

In the operation of the machine the transverse shaft 39 is rotated by its connection with the shaft 26 of the engine of the tractor through the medium of a worm movement the driving member 75 of which is fixed with relation to the driving shaft.

The driven member 76 of the movement is loosely mounted on the transverse shaft 39 inside a protective casing 77 and in rigid connection with one of the members of a friction clutch 78 disposed outside the same.

The movable member of the clutch which operates to make or break the rotative continuity of the worm wheel of the shaft 39 is connected with a pedal 79 in front of the driver's seat of the vehicle, by means of a rod 80.

The rotary movement imparted to the forward crank shaft by rotation of the transverse shaft when the clutch members are in operative connection, is communicated to the other crank shaft by means of chains 81 which are trained over sprocket wheels 82 and 83 at opposite ends of the two shafts.

The spades which are operated by rotation of the crank shafts, each consist of a pointed blade 84 mounted lengthwise of a flat stem 85 which at its upper end carries a head 86 for its connection wth one of the cranks. The blade is detachably fastened to an apertured shank 87 which is slidably connected at the lower end of the respective stem to allow of a yielding movement of the blade in the event of its encountering stones or other obstructive objects in the operation of the machine.

A transverse pin 88 at the lower extremity of each spade stem limits the downward movement of the respective shank and a coiled spring 89 placed between the shank and a cross pin 90 on the stem above the same, yieldingly holds the blade in its normal position at the lower end of its stem.

The blades are preferably double-pointed as best shown in Figure 6 so that they may be reversed in case one of its points become dull or broken.

Each of the four rakes connected with each of the two crank shafts is fulcrumed to convert its reciprocating up and downward motion into a simultaneous oscillating movement for the purpose of digging and throwing the soil in which it works.

The fulcrum is provided by a pair of spring-pressed trunnioned rollers 91 which are slidably mounted in a longitudinally slotted yoke 92 at opposite sides of the respective spade stem.

The yokes corresponding to the series of spades of each crank shaft are assembled between two parallel angle bars 93 with which they are connected by bolts 94.

The angle bars are at their ends connected to two of the uprights 37 of the carrier frame by headed pins 95 which extend loosely through registering holes thereof, and by providing a series of these holes in the uprights in vertical alinement, the fulcrums may be adjusted to different elevations for the purpose of varying the swing of the blades at the ends of the oscillating stems.

The coiled springs 96 pressing upon the fulcrum-rollers are at their outer ends engaged by screws 97 which are adjustable in correspondingly threaded apertures in the ends of the yokes.

The spades are arranged alternately with relation to the series of colters and when in the operation of the machine they are forcibly moved into and through the soil in a substantially elliptical path, they break the strips produced by the action of the colters into pieces which are lifted and thrown rearwardly as the machine moves forwardly along the field.

In order to provide for the efficient operation of the spades in turning the soil to a desired depth, at the expenditure of the minimum of power, the stems of the spades on the forward crank shaft are shorter than those of the other. The two crank shafts are arranged with relation to each other so that as each spade of the rear crank shaft enters the ground the corresponding spade on the first shaft is completely withdrawn therefrom. As a result of these arrangements the forward series of spades merely cuts the upper crust of the soil and prepare it for the second series which completes the spading action by going the full depth to which it is desired to till the soil, and the two series of spades at the same time operate without interfering with each other's action inasmuch as, as stated hereinbefore, each spade of the first series is completely withdrawn from the ground before the corresponding spade of the second series enters the same.

The clods of the soil thrown rearwardly by the action of the spades engage the disintegrating element at the rear end of the carrier which accomplishes the final pulverization of the soil and leaves it in a finely divided condition well adapted for seeding and for planting.

The disintegrating element above referred to consists of a rotary skeleton drum supported for rotation upon arms 98 extending longitudinally rearwardly from the lower section of the carrier frame. The boxes 99 in which the drum is supported are fastened upon saddles 100 of angle section which rest loosely upon the extension arms 98.

Brackets 101 secured to the uprights 37 at the rear end of the carrier frame, carry pins 102 for the pivotal connection of the saddles which to this end are provided with knuckles 103 through which the pins are extended.

One of the pins which is rotatably supported in its respective bracket, carries a gear wheel 104 which meshes with a similar wheel 105 at the adjacent end of the shaft 106 of the disintegrator, and it carries, furthermore, a sprocket wheel 117 for its operative connection with a corresponding wheel 115 on the rearmost crank-shaft through the medium of a sprocket chain 114.

The drum is composed of two spiders 113 fixed on the before-mentioned shaft 106, which have at the ends of a plurality of equidistant radial spokes, seats to receive one of the sides of bars 107 of angular section which are fastened therein by bolts or other similar means.

The revolving drum thus supported may be raised to different elevations by movement of its supporting saddles upon the pivot pins 102 and it is secured in its adjusted positions by bolts 108 which are inserted through openings in lugs 109 on the rearward uprights 37 of the carrier frame, and therewith registering openings of segmental arms 110 projecting upwardly from the saddles in fixed connection therewith.

A curved shield 112 rearward of the drum provides a restricted space in which outwardly thrown dirt is retained until by the action of the revolving disintegrating bars it has been reduced to the desired fineness.

In the operation of the machine the carrier is lowered to the operating position shown in Figure 2 in which the feet on its forwardly projecting arms rest upon the subjacent sills of the tractor frame.

The tractor moving over a piece of land to be tilled crushes by the contact of its supporting rollers, all vegetation and other obstructions extending in its path.

The flattened ground is cut into parallel strips by the colters which were lowered to enter the ground at a predetermined depth and these strips are subsequently broken by the action of the oscillating spades and thrown upwardly in clods of different sizes.

The larger clods are engaged by the longitudinal bars of the disintegrating drum which rotates in opposite direction to the movement of the spades, within the space restricted by the curved shield and are thereby reduced to a fineness suitable for seeding or for planting.

It will be seen that the engine of the tractor provides motive power for all the tilling elements assembled on the carrier and that it is also utilized to raise the carrier to an inoperative position when it is desired to transport the machine from one place to another.

It will also be observed that by connecting the arm 38 of the carrier to the shaft 39 on the tractor by means of boxes 41 the carrier is readily detached from the tractor rendering the latter available for other uses.

The connections of the rollers upon which the tractor is supported permit of its being readily turned in different directions, the adjustment of the colters and the spades allow of working the soil at different depths according to its nature and condition and the adjustment of the drum at the rear end of the carrier affords the opportunity of placing it where it is the most effective for the disintegration of the upwardly thrown clods of soil.

Having thus shown and described my improved ground tilling machine in the most practical form at present known to me, I desire it understood that variations in the construction and arrangement of its parts may be resorted to, as come within the scope of the following claims.

What I claim and desire to secure by Letters-Patent is:

1. In a ground-tilling machine, a spading element comprising a crank shaft, a spade having a stem connected with a crank thereof, and a fulcrum for said spade, consisting of a pair of rollers yieldingly engaging the stem at opposite sides thereof.

2. In a ground-tilling machine, a spading element comprising a crank shaft, a spade having a stem connected with a crank thereof, and a fulcrum for said spade, consisting of a pair of spring-pressed rollers yieldingly engaging the stem at opposite sides thereof.

3. In a ground-tilling machine, a spading element comprising a crank shaft, a spade having a stem connected with a crank thereof, and a fulcrum for said spade, consisting of a movably supported yoke, and spring-pressed rollers slidably mounted in said yoke and engaging the stem at opposite sides thereof.

4. In a ground tilling machine, a carrier, and two series of spades operatively mounted thereon, one forward of the other, the spades of the forward series being adapted to enter the ground over which the carrier is propelled, to a lesser depth than the spades of the following series.

5. In a ground tilling machine, a carrier, two parallel multiple crank-shafts thereon, one forward of the other, and spades operatively connected with the cranks of said shafts to enter the ground over which the carrier is propelled, the shafts being arranged with relation to each other so that each spade on the forward shaft is withdrawn from the ground before the corresponding spade on the other shaft enters the same.

6. In a ground-tilling machine, a carrier, two parallel multiple crank-shafts thereon, one forward of the other, and spades operatively connected with the cranks of said shafts to enter the ground over which the carrier is propelled, the spades and their respective shafts being relatively arranged so that the spades of the forward shaft enter the ground to a lesser depth than those on the other.

7. In a ground-tilling machine, a carrier, two parallel multiple crank-shafts thereon, one forward of the other, and spades operatively connected with the cranks of said shafts to enter the ground over which the carrier is propelled, the spades and their respective shafts being relatively arranged so that the spades of the forward shaft enter the ground to a lesser depth than those on the other, and so that each spade on the forward shaft is withdrawn from the ground before the corresponding spade on the other shaft enters the same.

In testimony whereof I have affixed my signature.

FRED E. LARSON.